(No Model.)

E. B. BARKER.
FOCUSING ATTACHMENT FOR PHOTOGRAPHIC CAMERAS.

No. 258,350. Patented May 23, 1882.

WITNESSES:
D. Twitchell
C. Sedgwick

INVENTOR:
E. B. Barker
BY
Munn & Co
ATTORNEYS.

N. PETERS. Photo-Lithographer, Washington, D. C.

UNITED STATES PATENT OFFICE.

ERASTUS B. BARKER, OF NEW YORK, N. Y., ASSIGNOR TO E. & H. T. ANTHONY & CO., OF SAME PLACE.

FOCUSING ATTACHMENT FOR PHOTOGRAPHIC CAMERAS.

SPECIFICATION forming part of Letters Patent No. 258,350, dated May 23, 1882.

Application filed April 7, 1882. (No model.)

*To all whom it may concern:*

Be it known that I, ERASTUS B. BARKER, of the city, county, and State of New York, have invented certain new and useful Improvements in Focusing Attachments for Photographic Cameras, of which the following is a full, clear, and exact description.

Reference is to be had to the accompanying drawings, forming a part of this specification, in which similar letters of reference indicate corresponding parts in all the figures.

Figure 1:
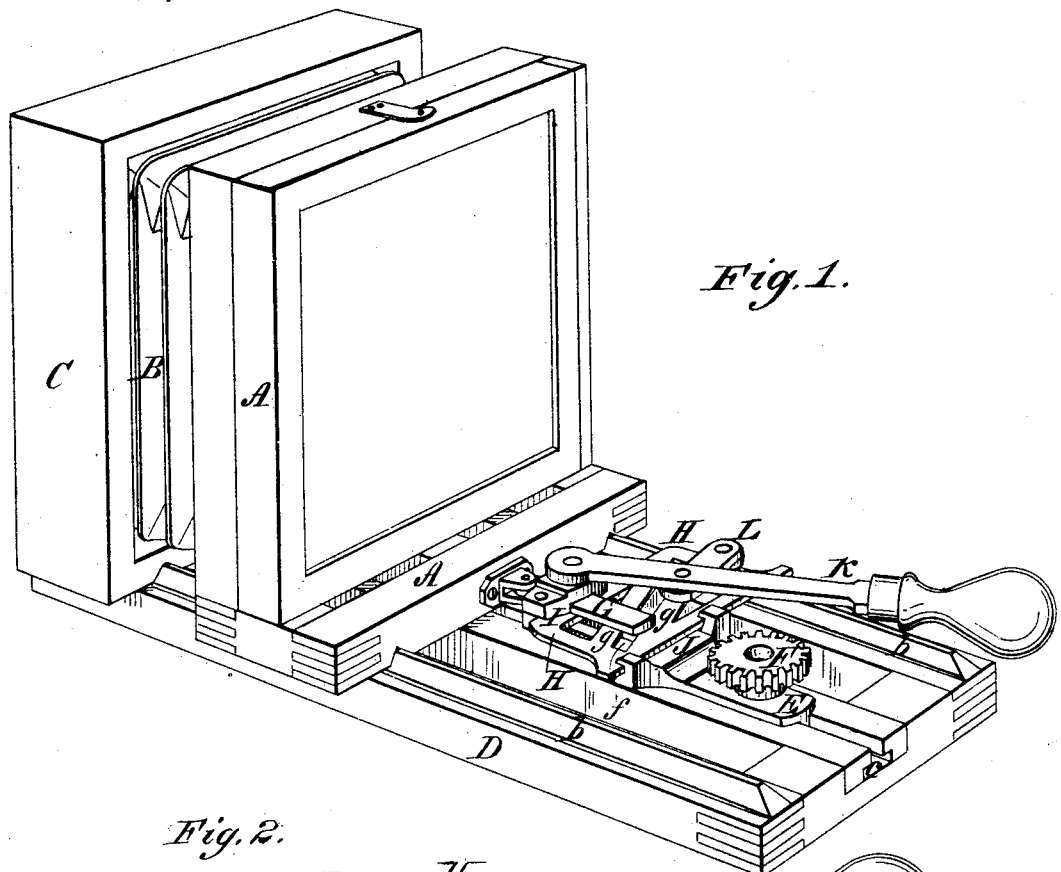
Figure 2:
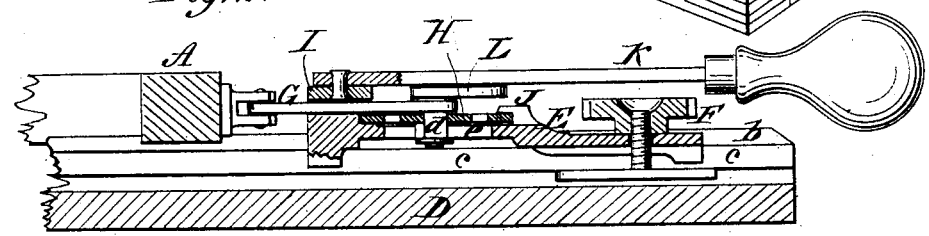
Figure 3:
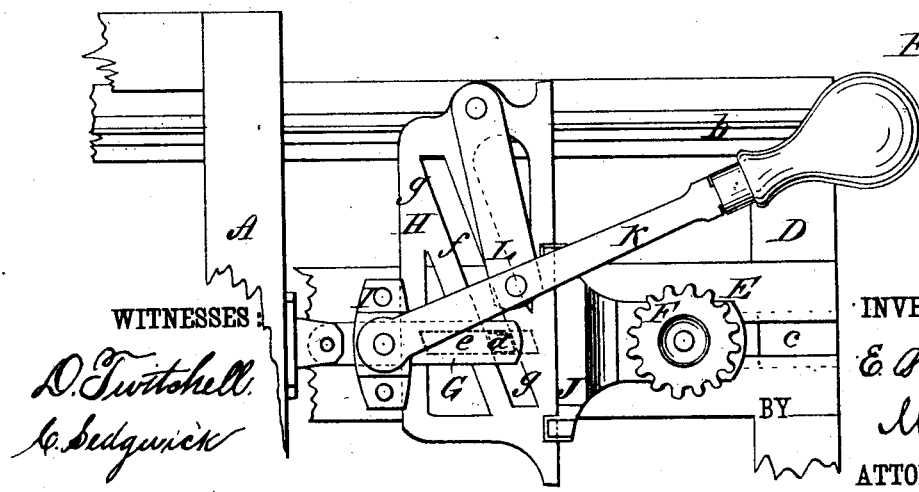

Figure 1 represents a view in perspective of a photographic camera with my invention applied. Fig. 2 is a longitudinal vertical section in illustration of the improved focusing attachment, and Fig. 3 a partial plan of the same.

This invention relates to means of adjusting the rear part of a camera-body for bringing the prepared plate in the focus of the lens; and it consists in a novel means for specially adjusting the same, to be used in connection with a general means of adjustment, and whereby increased facility is afforded for effecting the necessary adjustment, and the special means used for the purpose are self locking or holding.

In the drawings, A indicates the rear part or frame of a photographic camera, connected by a bellows-like structure, B, with the forward part or frame, C, of the camera, and adjustable along ways *b b* of a base-piece, D, toward or from said front frame, to bring the prepared plate in the focus of the lens. Said rear frame, A, is made generally adjustable by means of a plate, E, which is guided by and fitted to slide along an inverted T or other suitably-shaped groove, *c*, in the base-piece D, and is connected with the rear frame, A, and when adjusted is held in position by a binding-nut, F. Such or other general adjustment, however, is not sufficient of itself to set with the nicety which is required the prepared plate in the rear frame to its proper distance from the lens, and special means for this purpose to give a closer adjustment are consequently necessary, and a difficulty in working these means of adjustment has arisen from the fact that the operator is necessitated to work in darkness under cover of the cloth.

The special means which I adopt, and that may be used in connection with the general means hereinafter referred to, are as follows:

G is a bar attached at its one end to the rear frame or part of the camera-body, and provided at its opposite end with a projection, *d*, which passes down within a longitudinal slot, *e*, in the plate E. Between this bar G and said plate E is a plate, H, which is fitted to slide transversely across the plate E, between or within front and back cheeks or guides, I J. This transverse plate H has a slot, *f*, in it, which is oblique to the line of motion of the plate E, and through which the projection *d* of the bar E passes, so that the opposite sides of said oblique slot constitute reverse wedges *g g* against the front and back sides of the projection *d*.

Pivoted to the cheek I is a lever, K, extending toward or beyond that end of the base-piece D which is next to the operator. This lever K is attached by a link, L, to one end of the transverse slide or plate H, so that accordingly as said lever is moved to the right or to the left does the double wedge or opposite wedges, *g g*, formed by the sides of the oblique slot *f*, move the bar G backward or forward, and with it similarly move the rear part of the camera-body A. This constitutes a very exact and easy means of specially adjusting the focus of the instrument, and no screws or other fastenings are required to hold it in position after the focus has been once drawn, the sides of the oblique slot *f* in the transverse slide or plate H preventing any forward or backward motion of the bar G, and the slot in the plate E preventing any lateral motion of said bar during its movement by said bar being guided by and sliding therein.

In some cases the lever K and link L may be dispensed with and the transverse slide or plate H be adjusted directly by hand or otherwise.

Having thus described my invention, I claim as new and desire to secure by Letters Patent—

1. The bar G, attached at one end to the rear frame, A, and having at its forward end a projection, *d*, in combination with the plate E, having long slot *e*, and the transversely-sliding plate H, having oblique slot $f$, forming the reverse wedges $g\ g$, as and for the purpose specified.

2. The combination, with the rear part of the body of the camera, the base-piece on or along which said body part slides, and the general adjusting or sliding plate E, provided with means for securing it, of the transverse slide or plate H, having an oblique slot, $f$, and the sliding bar G, connecting the obliquely-slotted portion of said plate H with the rear part of the body of the camera, essentially as and for the purposes herein set forth.

3. The combination, with the longitudinally-adjustable plate E and the transversely-sliding plate H, constructed to form reverse wedges $g\ g$, of the lever K, attached to said plates E H, the bar G, the rear body part, A, of the camera, and the base-piece D, substantially as shown and described.

ERASTUS B. BARKER.

Witnesses:
   C. SEDGWICK,
   D. M. HOLDREDGE.